H. F. HICKS.
Stubble-Cutter.
No. 26,034.  Patented Nov. 8, 1859.
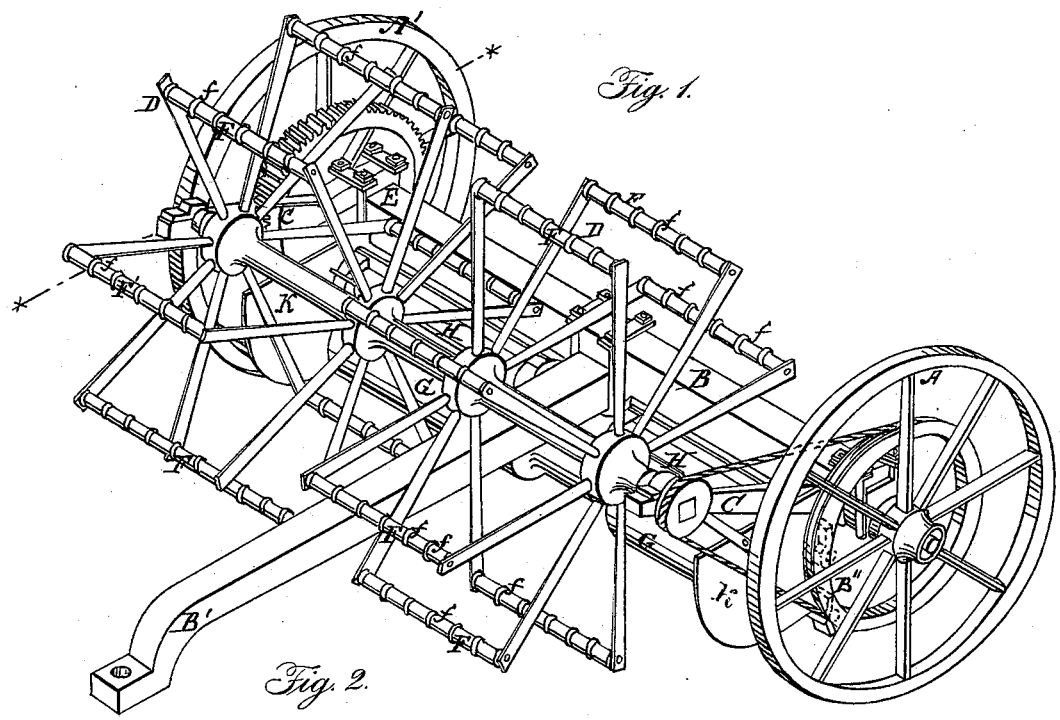
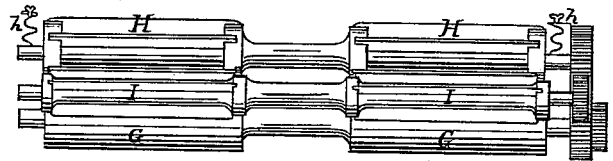
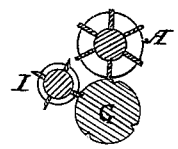
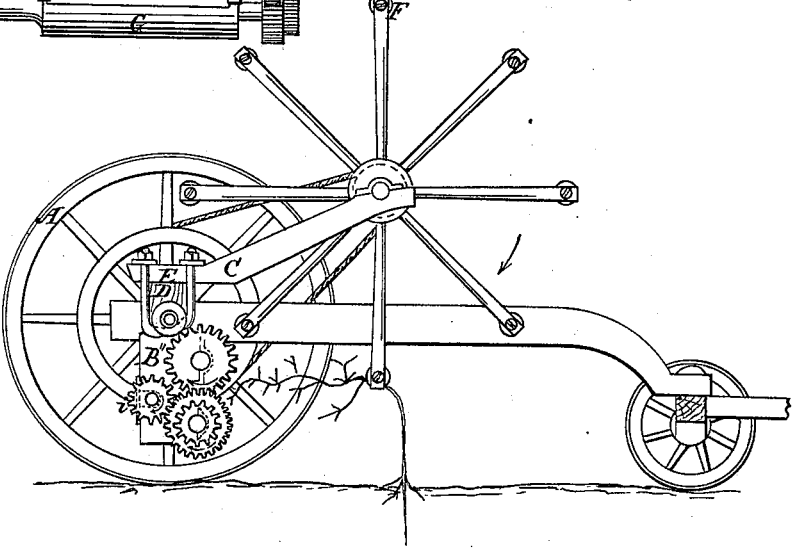
Witnesses:
Inventor:
Horatio F. Hicks.

UNITED STATES PATENT OFFICE.

HORATIO F. HICKS, OF GRAND VIEW, INDIANA.

IMPROVEMENT IN MACHINES FOR PULLING AND CUTTING COTTON AND CORN STALKS.

Specification forming part of Letters Patent No. 26,034, dated November 8, 1859.

*To all whom it may concern:*

Be it known that I, HORATIO F. HICKS, of Grand View, Spencer county, Indiana, have invented a new and useful Machine for Pulling and Cutting Stubble; and I hereby declare the following to be a full, clear, and exact description thereof, reference being had to the accompanying drawings, making part of this specification.

My invention consists in an automatic provision for uprooting standing cotton-stalks and the like, and reducing them to fragments suitable for tillage and manure.

In the accompanying drawings, Figure 1 is a perspective view of the machine. Figs. 2 and 3 are respectively a rear elevation and a transverse section of the gathering and cutting mechanism detached. Fig. 4 is a side elevation of the machine, a wheel being removed.

A A' B B' are the wheels, axle, and perch of a common wagon hind gear.

D D' are two reels attached to a single shaft, which derives motion (see arrow) from the ground-wheel A.

The arms C, which support the reel-shaft, may be set at different angles of elevation by means of reversible wedges E. This provision enables the machine to be adapted to stalks of greater or less altitude.

The effective part of each reel consists of rollers F, having a number of flanges or collars, *f*, to prevent the stalks slipping off to either side. These reels act to bend backward the stalks to be operated on by the pulling and cutting mechanism. This mechanism is supported in suitable cheeks, B'', depending from the axle B, and consists as follows:

G is a wooden drum, and H a paddle, rotated nearly in contact with each other (see arrow) by motion derived from the wheel A'.

I is a cutter-head whose knives *i* may be similar to those of a common straw-cutter. The knives *i* revolve (see arrow) in close contact with the drum G.

K are prows or guards to prevent the lateral displacement of the stalks.

The speeds of the reel and of the gathering and cutting mechanism must be sufficiently in excess of the draft to insure the bending backward and uprooting of the stalks as the machine advances.

The drum may have longitudinal ribs or grooves corresponding to the cutter-blades. (See Fig. 3.)

The head may be set up to its work as it wears by being journaled in sliding boxes provided with set-screws *i*.

The paddle H may be held to its work by springs *h*, whose tension may be regulated by set-screws.

The machine may be so constructed as to operate on a greater or on a less number of rows than the one represented. The machine being drawn along so that one reel passes over each row of stalks, the reels act to bend the tops of the stalks back, and thus to throw them in contact with the paddle H, between which and the drum G the stalks being drawn are chopped or severed into fragments by the action of the knives *i* against the drum G, whence, falling, the fragments are left evenly distributed upon the ground, conveniently for plowing under.

It will be seen that all the operative parts move with a continuous and sustained momentum and act to draw the machine forward.

I claim as new and of my invention herein and desire to secure by Letters Patent—

The combination of the reel D, paddle H, drum G, and cutter I, operating substantially as and for the purpose set forth.

In testimony of which invention I hereunto set my hand.

HORATIO F. HICKS.

Witnesses:
GEO. H. KNIGHT,
FRANCIS MILLWARD.